US006910334B2

(12) United States Patent
Kalina (10) Patent No.: US 6,910,334 B2
(45) Date of Patent: *Jun. 28, 2005

(54) POWER CYCLE AND SYSTEM FOR UTILIZING MODERATE AND LOW TEMPERATURE HEAT SOURCES

(75) Inventor: Alexander I. Kalina, Hillsborough, CA (US)

(73) Assignee: Kalex, LLC, Belmont, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 10/770,845

(22) Filed: Feb. 3, 2004

(65) Prior Publication Data

US 2004/0182084 A1 Sep. 23, 2004

Related U.S. Application Data

(63) Continuation-in-part of application No. 10/669,134, filed on Sep. 23, 2003, which is a continuation-in-part of application No. 10/357,328, filed on Feb. 3, 2003, now Pat. No. 6,769,256.

(51) Int. Cl.$^7$ .............................. F01K 7/34; F01K 25/06
(52) U.S. Cl. ........................ 60/651; 60/641.2; 60/649; 60/653; 60/671; 60/676
(58) Field of Search ............................. 60/641.2, 649, 60/651, 653, 671, 673, 676

(56) References Cited

U.S. PATENT DOCUMENTS

| | | | |
|---|---|---|---|
| 3,979,914 A | * 9/1976 | Weber | 60/678 |
| 4,346,561 A | 8/1982 | Kalina | 60/673 |
| 4,433,545 A | * 2/1984 | Chang | 60/678 |
| 4,489,563 A | 12/1984 | Kalina | 60/673 |
| 4,548,043 A | 10/1985 | Kalina | 60/673 |
| 4,586,340 A | 5/1986 | Kalina | 60/649 |
| 4,604,867 A | 8/1986 | Kalina | 60/653 |
| 4,674,285 A | 6/1987 | Durrant et al. | 60/646 |
| 4,732,005 A | 3/1988 | Kalina | 60/649 |
| 4,763,480 A | 8/1988 | Kalina | 60/673 |
| 4,899,545 A | 2/1990 | Kalina | 60/673 |
| 4,982,568 A | 1/1991 | Kalina | 60/649 |
| 5,029,444 A | 7/1991 | Kalina | 60/673 |
| 5,095,708 A | 3/1992 | Kalina | 60/673 |
| 5,440,882 A | 8/1995 | Kalina | 60/641.2 |
| 5,450,821 A | 9/1995 | Kalina | 122/1 R |
| 5,572,871 A | 11/1996 | Kalina | 60/649 |
| 5,588,298 A | 12/1996 | Kalina et al. | 60/676 |
| 5,603,218 A | 2/1997 | Hooper | 60/655 |
| 5,649,426 A | 7/1997 | Kalina et al. | 60/649 |
| 5,754,613 A | 5/1998 | Hashiguchi et al. | 376/378 |
| 5,822,990 A | 10/1998 | Kalina et al. | 60/649 |
| 5,950,433 A | 9/1999 | Kalina | 60/649 |
| 5,953,918 A | 9/1999 | Kalina et al. | 60/653 |
| 6,347,520 B1 | 2/2002 | Ranasinghe et al. | 60/649 |
| 6,769,256 B1 | * 8/2004 | Kalina | 60/653 |

FOREIGN PATENT DOCUMENTS

JP    948 15132    10/1995

OTHER PUBLICATIONS

NEDO Brochure, "ECO–Energy City Project", 1994.
NEDO Report published 1996, pp. 4–6, 4–7, 4–43, 4–63, 4–53.

* cited by examiner

*Primary Examiner*—Sheldon J Richter
(74) *Attorney, Agent, or Firm*—Robert W Strozier (57) ABSTRACT

A new thermodynamic cycle is disclosed for converting energy from a low temperature stream, external source into useable energy using a working fluid comprising of a mixture of a low boiling component and a higher boiling component and including a higher pressure circuit and a lower pressure circuit. The cycle is designed to improve the efficiency of the energy extraction process by recirculating a portion of a liquid stream prior to further cooling. The new thermodynamic processes and systems for accomplishing these improved efficiencies are especially well-suited for streams from low-temperature geothermal sources.

9 Claims, 5 Drawing Sheets

POWER CYCLE AND SYSTEM FOR UTILIZING MODERATE AND LOW TEMPERATURE HEAT SOURCES

RELATED APPLICATIONS

This application is a Continuation-in-Part of U.S. patent application Ser. No. 10/669,134, filed 23 Sep. 2003 which is a Continuation-in-Part of U.S. patent application Ser. No. 10/357,328 filed 3 Feb. 2003, now U.S. Pat. No. 6,769,256.

BACKGROUND OF THE INVENTION

1. Field of the Invention

The present invention relates to a system and method for the utilization of heat sources with moderate to low initial temperature, such as geothermal waste heat sources or other similar sources.

More particularly, the present invention relates to a system and method for the utilization of heat sources with moderate to low initial temperature, such as geothermal waste heat sources or other similar sources involving a multi-staged heating process and at least one separation step to enrich the working fluid which is eventually fully vaporized for energy extraction.

2. Description of the Related Art

In the prior art, U.S. Pat. No. 4,982,568, a working fluid is a mixture of at least two components with different boiling temperatures. The high pressure at which this working fluid vaporizes and the pressure of the spent working fluid (after expansion in a turbine) at which the working fluid condenses are chosen in such a way that at the initial temperature of condensation is higher than the initial temperature of boiling. Therefore, it is possible that the initial boiling of the working fluid is achieved by recuperation of heat released in the process of the condensation of the spent working fluid. But in a case where the initial temperature of the heat source used is moderate or low, the range of temperatures of the heat source is narrow, and therefore, the possible range of such recuperative boiling-condensation is significantly reduced and the efficiency of the system described in the prior art diminishes.

Thus, there is a need in the art for a new thermodynamic cycle and a system based thereon for enhanced energy utilization and conversion.

SUMMARY OF THE INVENTION

The present invention provides a method for extracting thermal energy from low to moderate temperatures source streams including the step of transforming thermal energy from a fully vaporized boiling stream into a usable energy form to produce a lower pressure, spent stream. The fully vaporized boiling stream is formed by transferring thermal energy from an external heat source stream to a boiling stream to form the fully vaporized boiling stream and a cooled external heat source stream. The method also includes the steps of transferring thermal energy from the spent stream to a first portion of a heated higher pressure, basic working fluid stream to form a partially condensed spent stream and a first pre-heated, higher pressure, basic working fluid stream and transferring thermal energy from the cooled external heat source stream to a second portion of the heated higher pressure, basic working fluid stream to form a second pre-heated, higher pressure, basic working fluid stream and a spent external heat source stream. The method also includes the steps of combining the first and second pre-heated, higher pressure basic working fluid streams to form a combined pre-heated, higher pressure basic working fluid stream and separating the partially condensed spent stream into a separated vapor stream and a separated liquid stream. The method also includes the steps of pressurizing a first portion of the separated liquid stream to a pressure equal to a pressure of the combined pre-heated, higher pressure basic working fluid stream to form a pressurized liquid stream and combining the pressurized liquid stream with the combined pre-heated, higher pressure basic working fluid stream to form the boiling stream. The method also includes the steps of combining a second portion of the separated liquid stream with the separated vapor stream to from a lower pressure, basic working fluid stream and transferring thermal energy from the lower pressure, basic working fluid stream to a higher pressure, basic working fluid stream to form the heated, higher pressure, basic working fluid stream and a cooled, lower pressure, basic working fluid stream. The method also includes the steps of transferring thermal energy cooled, lower pressure, basic working fluid stream to an external coolant stream to from a spent coolant stream and a fully condensed, lower pressure, basic working fluid stream; and pressurizing the fully condensed, lower pressure, basic working fluid stream to the higher pressure, basic working fluid stream.

In a more efficient implementation of the present invention, the method provides the additional steps of separating the boiling stream into a vapor stream and a liquid stream; combining a portion of the liquid stream with the vapor stream and passing it through a small heater exchanger in contact with the external heat source stream to insure complete vaporization and superheating of the boiling stream. A second portion of the liquid stream is depressurized to a pressure equal to a pressure of the spent stream.

In a more yet more efficient implementation of the present invention, the method provides in addition to the additional steps described in paragraph 0006, the steps of separating the depressurized second portion of the liquid stream of paragraph 0006 into a vapor stream and a liquid stream, where the vapor stream is combined with the pressurized liquid stream having the parameters of the point 9 and repressurized before being combined with the stream having the parameters of the point 8. While the liquid stream is depressurized to a pressure equal to a pressure of the spent stream having the parameters of the point 18.

The present invention also provides a two cycle thermodynamic method where a first boiling composition is heated, vaporized, expanded in a turbine to extract a quantity of more useable energy such as electric energy and condensed and a recirculating composition is heated, partially vaporized, expanded in the same turbine to extract a quantity of more useable energy such as electric energy and condensed, where the two cycle improve an overall efficiency of the energy conversion system.

The present invention provides a systems as set forth in FIGS. 1A–D and 2 adapted to implement the methods of this invention.

DESCRIPTION OF THE DRAWINGS

The invention can be better understood with reference to the following detailed description together with the appended illustrative drawings in which like elements are numbered the same.

DETAILED DESCRIPTION OF THE INVENTION

The inventors have found that a novel thermodynamical cycle (system and process) can be implemented using a working fluid including a mixture of at least two components. The preferred working fluid being a water-ammonia mixture, though other mixtures, such as mixtures of hydrocarbons and/or freons can be used with practically the same results. The systems and methods of this invention are more efficient for converting heat from relatively low temperature fluid such as geothermal source fluids into a useful form of energy. The systems use a multi-component basic working fluid to extract energy from one or more (at least one) geothermal source streams in one or more (at least one) heat exchangers or heat exchange zones. The heat exchanged basic working fluid then transfers its gained thermal energy to a turbine (or other system for extracting thermal energy from a vapor stream and converting the thermal energy into mechanical and/or electrical energy) and the turbine converts the gained thermal energy into mechanical energy and/or electrical energy. The systems also include pumps to increase the pressure of the streams at certain points in the systems and a heat exchangers which bring the basic working fluid in heat exchange relationships with a cool stream. One novel feature of the systems and methods of this invention, and one of the features that increases the efficiency of the systems, is the result of using a split two circuit design having a higher pressure circuit and a lower pressure circuit and where a stream comprising spent liquid separated for spent vapor from the higher pressure circuit is combined with a stream comprising the spent lower pressure stream at the pressure of the spent lower pressure stream prior to condensation to from the initial fully condensed liquid stream and where the combined stream is leaner than the initial fully condensed liquid stream. The present system is well suited for small and medium signed power units such as 3 to 5 Mega Watt power facilities.

The working fluid used in the systems of this inventions preferably is a multi-component fluid that comprises a lower boiling point component fluid—the low-boiling component—and a higher boiling point component—the high-boiling component. Preferred working fluids include an ammonia-water mixture, a mixture of two or more hydrocarbons, a mixture of two or more freon, a mixture of hydrocarbons and freon, or the like. In general, the fluid can comprise mixtures of any number of compounds with favorable thermodynamic characteristics and solubility. In a particularly preferred embodiment, the fluid comprises a mixture of water and ammonia.

It should be recognized by an ordinary artisan that at those point in the systems of this invention were a stream is split into two or more sub-streams, the valves that effect such stream splitting are well known in the art and can be manually adjustable or are dynamically adjustable so that the splitting achieves the desired improvement in efficiency.

Figure 1A:
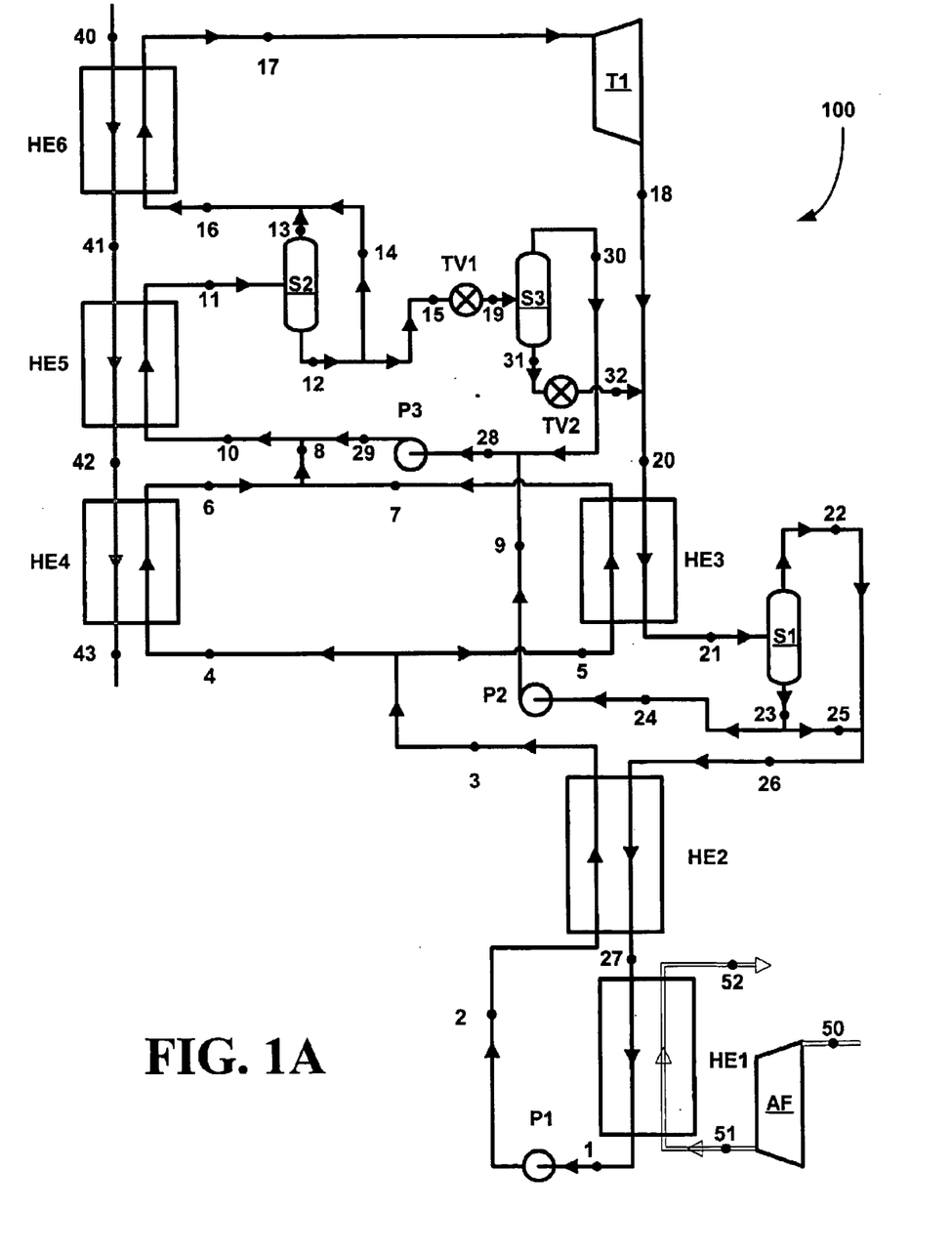
FIG. 1A depicts a schematic of a preferred thermodynamic cycle of this invention.

Referring now to FIG. 1A, a preferred embodiment of a system of this invention, generally 100, is shown. The system 100 is described in terms of its operation using streams, conditions at points in the system, and equipment. A fully condensed working fluid stream at a temperature close to ambient having parameters as at a point 1, enters a feed pump P1, where it is pumped to an elevated pressure, and obtains parameters as at a point 2. The composition of the working fluid stream having the parameters of the point 2 will be hereafter referred to as a "basic composition" or "basic solution." The working fluid stream having the parameters of the point 2, then passes through a recuperative pre-heater or heat exchanger HE2, where it is heated in counter flow by a returning stream of the basic solution as described below, and obtains parameters as at a point 3. The state of the basic working solution at the point 3 corresponds to a state of saturated, or slightly sub-cooled liquid.

Thereafter, the stream of basic solution having the parameters of the point 3 is divided into two sub-streams having parameters as at points 4 and 5, respectively. The sub-stream having the parameters of the point 4, then passes through a heat exchanger HE4, where it is heated and partially vaporized by a stream of a heat source fluid (e.g., geothermal brine stream) having parameters as at a point 42 as described below, and obtains parameters as at a point 6. While, the stream of basic solution having the parameters of the point 5 passes though a heat exchanger HE3, where it is heated and partially vaporized by a condensing stream having parameters as at a point 20 in a condensing process 20–21 also described below and obtains parameters as at a point 7. Thereafter, the sub-streams having parameters as at points 6 and 7 are combined, forming a combined stream having parameters as at a point 8. The stream of basic solution having the parameters of the point 8 is then combined with a stream of a recirculating solution having parameters as at a point 29 as described below, and forms a stream of a boiling solution having parameters as at a point 10. The stream having the parameters of the point 29 is in a state of sub-cooled liquid, and, therefore, as a result of the mixing of the streams having the parameters of the points 8 and 29, a substantial absorption of vapor occurs, and the temperature rises substantially. Thus, a temperature of the stream having the parameters of the point 10 is usually significantly higher than that of the stream having the parameters of the point 8. The composition of the stream having the parameters of the point 10 is referred to herein as a "boiling solution."

The stream of boiling solution having the parameters of the point 10, then passes through a heat exchanger HE5, where it is heated and vaporized by the stream of the heat source fluid having parameters as at a point 41. The vaporized stream exiting the heat exchanger HE5 now has parameters as at a point 11. The stream having the parameters of the point 11 then enters into a gravity separator S2, where it is separated into a vapor stream having parameters as at a point 13 and a liquid stream having parameters as at a point 12. The liquid stream having the parameters of the point 12 is then divided into two sub-streams having parameters as at points 14 and 15, respectively. The sub-stream having the parameters of the point 14 usually represents a very small portion of the total liquid stream, and is combined with the vapor stream having the parameters of the point 13 as described below, forming a stream of working solution with parameters as at a point 16. The stream of working solution having the parameters of the point 16, then passes through a heat exchanger HE6 (a small heat exchanger sometimes called a vapor drier to insure that the state of the stream exiting the heat exchanger is a superheated vapor), where it is further heated by the stream of the heat source fluid having parameters as at a point 40, to form a fully vaporized and slightly superheated stream having parameters as at a point 17. Thereafter, the stream of working solution having the parameters of the point 17 passes through a turbine T1, where it is expanded, producing useful power (conversion of thermal energy into mechanical and electrical energy) to form a stream having parameters as at a point 18.

The recirculating liquid having the parameters of the point 15 as described above passes through a throttle valve TV1, where its pressure is reduce to an intermediate pressure to form a stream having parameters as at a point 19. As a result of throttling, the parameters of the stream at the point 19 correspond to a state of a vapor-liquid mixture. The stream having the parameters of the point 19, then enters into a gravity separator S3, where it is separated into a vapor stream having parameters as at the point 30, and a liquid stream having parameters as at a point 31. The liquid stream having the parameters of the point 31 passes through a second throttle valve TV2, where its pressure is further reduced to a pressure to form a stream having parameters as at a point 32, where the pressure of the stream having the parameters of the point 32 is equal to a pressure of the stream having the parameters of the point 18 as described above. Thereafter, the stream having the parameter of the point 32 and the stream having the parameters of the point 18 are combined forming a stream of a condensing solution having the parameters of the point 20. The stream having parameters of the point 20 passes through the heat exchanger HE3, in counter flow to the stream having the parameters of the point 5, in a cooling process 5–7. After passing through the heat exchanger HE3, the stream having the parameters of the point 20 is partially condensed, releasing heat for the heating process 20–21 described above and obtains parameters as at a point 21.

The stream having the parameters of the point 21 then enters into a gravity separator S1, where it is separated into a vapor stream having parameters as at a point 22 and a liquid stream having parameters as at a point 23. The liquid stream having the parameters of the point 23 is in turn divided into two sub-streams having parameters as at points 25 and 24, respectively. The liquid sub-stream having the parameters of the point 25 is then combined with the vapor stream having the parameters of the point 22, forming a stream of the basic solution having parameters as at a point 26.

The liquid sub-stream having parameters of the point 24 enters a circulating pump P2, where its pressure is increased to a pressure equal to a pressure in gravity separator S3, i.e., equal to a pressure of the vapor stream having the parameters of the point 30 described above, and obtains parameters as at point 9. The liquid stream having the parameters of the point 9 is in a state of a sub-cooled liquid. The liquid stream having the parameters of point 9 is then combined with the vapor stream having the parameters of the point 30 described above. A pressure of the streams having the parameters of the points 9 and 30 is chosen in such a way that the sub-cooled liquid having the parameters of the point 9 fully absorbs all of the vapor stream having the parameters of the point 30, forming a liquid stream having parameters as at point 28. The liquid stream having the parameters of the point 28 is in a state of saturated or sub-cooled liquid. Thereafter, the stream having the parameters of the point 28 enters into a circulating pump P3, where its pressure is increased to a pressure equal to a pressure of the stream having the parameters of the point 8, and obtains parameters of the point 29 described above. The stream having the parameters of the point 29 is then combined with the stream of basic solution having the parameters of the point 8, forming the stream of the boiling solution having the parameters of the point 10 described above.

The stream of basic solution having the parameters of the point 26 enters into the heat exchanger HE2, where it partially condenses releasing heat for a heating process 2–3 described above, and obtains parameters as at a point 27. Thereafter the stream of basic solution having the parameters of the point 27 enters into a condenser HE1, where its is cooled and fully condensed by an air or water stream having parameters as at point 51 described below, and obtains parameters of the point 1.

An air (or water) stream having parameters as at a point 50 enters an air fan AF (or compressor in the case of water) to produce an air stream having parameters as at a point 51, which forces the air stream having the parameters of the point 51 into the heat exchanger HE1, where it cools the stream of basic working fluid in a cooling process 27–1, and obtains parameters as at point 52.

The stream of heat source fluid with the parameters of the point 40 passes through the heat exchanger HE6, where it provides heat from a heating process 6–17, and obtains the parameters of the point 41. The stream of heat source fluid having the parameters of the point 41 passes through the heat exchanger HE5, where it provides heat for a heating process 10–11, and obtains the parameters of the point 42. The stream of heat source fluid having the parameters of the point 42 enters into the heat exchanger HE4, where it provides heat for a heating process 4–6 and obtains parameters as at point 43.

In the previous variants of the systems of this invention, the recirculating stream having parameters as at the point 29 was mixed with the stream of basic solution having parameters as at the point 8. As a result of this mixing, a temperature of the combined stream having parameters as at the point 10 was substantially higher than a temperature of the streams having parameters as at the points 8 and 29.

Figure 1B:
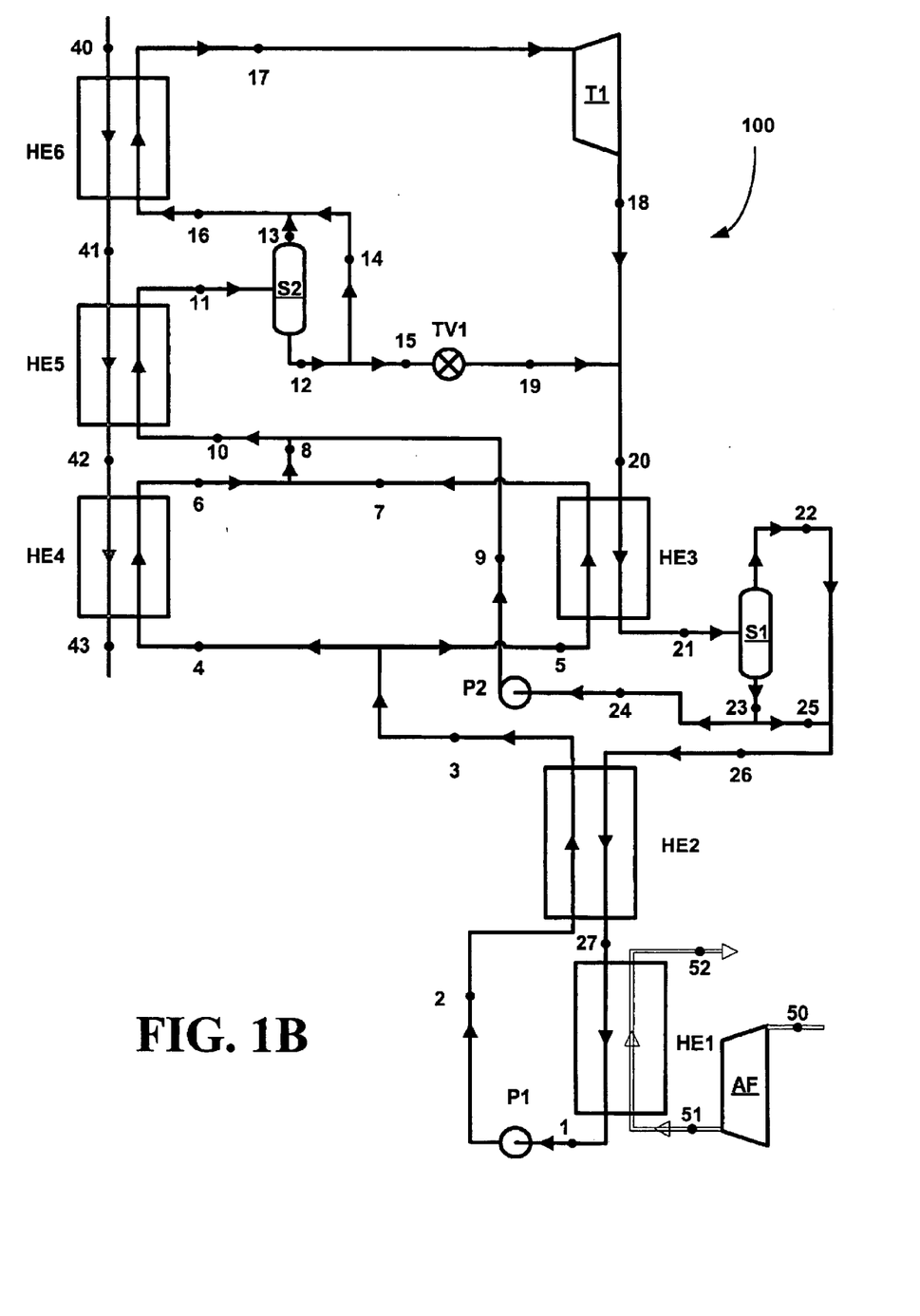
FIG. 1B depicts a schematic of another preferred thermodynamic cycle of this invention.
Figure 1C:
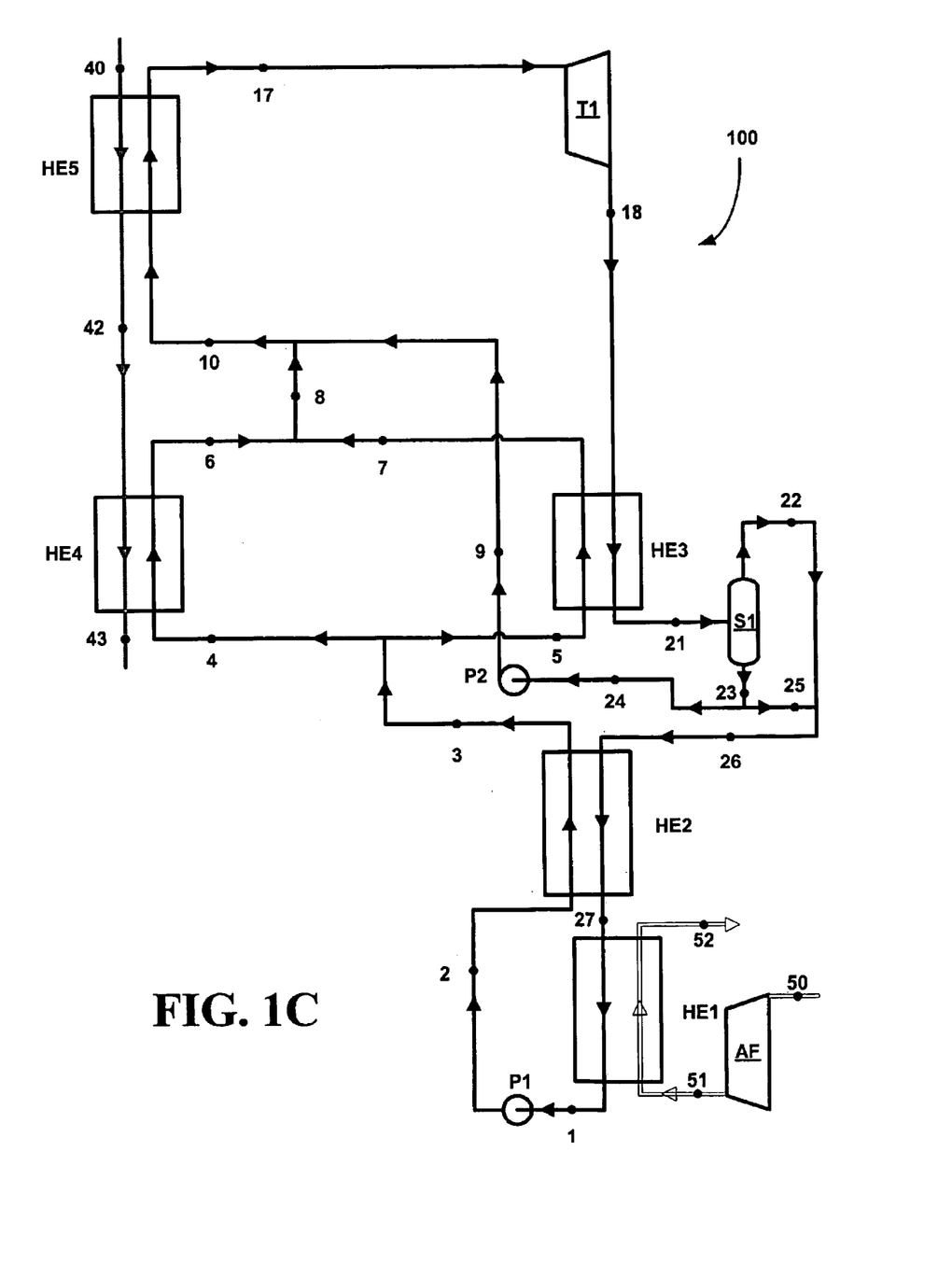
FIG. 1C depicts a schematic of another preferred thermodynamic cycle of this invention.
Figure 1D:
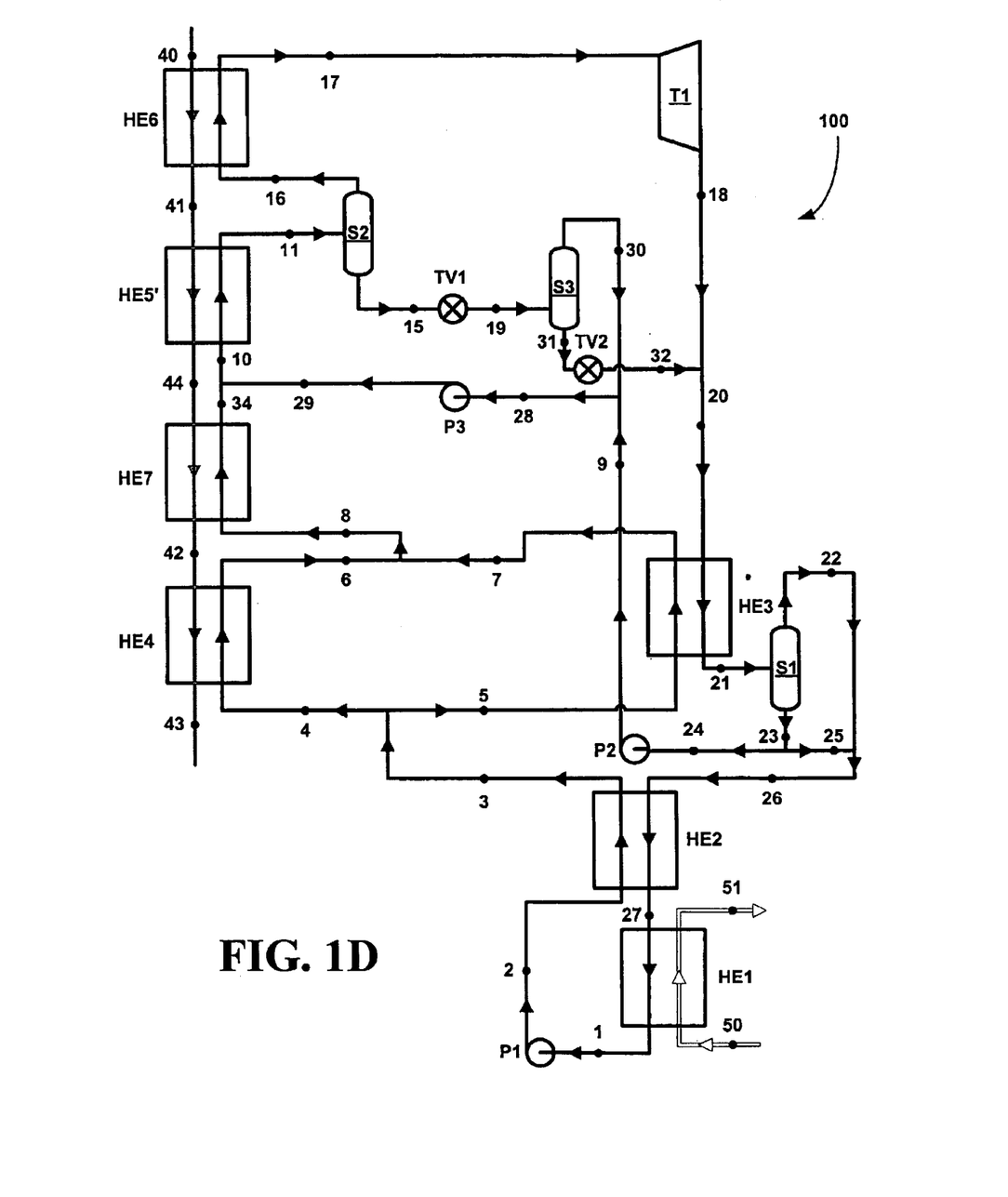
FIG. 1D depicts a schematic of another preferred thermodynamic cycle of this invention.

Referring now to FIG. 1D, another embodiment of the system of this invention, generally 100, is shown to includes an additional heat exchanger HE7, i.e., the heat exchanger HE5 is split into two heat exchangers HE5' and HE7 designed to reduce the temperature difference between the stream, having the parameters as at the point 10 and the streams having the parameters as at the points 8 and 29.

In the new embodiment, the stream with parameters as at the point 8 is sent into the heat exchanger HE7 where it is heated and further vaporized by a heat source stream, such as a geothermal fluid stream, having the parameters as at a point 44 producing the heat source stream having parameters as at the point 42 in a counter flow heat exchange process 44–42 and a stream having parameters as at a point 34. Only then is the steam having the parameters as at the point 34 mixed with a recirculating stream having the parameters as at the point 29 (as described above) forming a combined stream having parameters as at the point 10. A temperature at of the stream having the parameters as at the point 34 is chosen in such a way that the temperature of the stream having the parameters as at the point 10 is equal or very close to the temperature of the stream having the parameters as at the point 34. As a result, the irreversibility of mixing a stream of basic solution and a stream of recirculating solution is drastically reduced. The resulting stream having the parameters as at the point 10 passes through the heat exchanger HE5' where it is heated and vaporized in a counter flow process 41–44 by the heat source stream such as a geothermal fluid stream having the parameters as at the point 41.

This embodiment can also include a sub-streams having parameter as at points 14, as described above, which usually represents a very small portion of the total liquid stream, and is combined with the vapor stream having the parameters of the point 13 (not shown) as described below, to form the stream of working solution with parameters as at the point 16. Additionally, this embodiment can also include the AF unit and associated streams as described above.

The advantages of the arrangement of streams shown in the present embodiment include at least the following: a temperature difference in the heat exchanger HE7 (which is, in essence, the low temperature portion of the heat exchanger HE5 in the previous variants), are substantially increased and therefore the size of the heat exchanger HE7 is reduced, while the heat exchanger HE5' of this embodiment works in absolutely the same way as the high temperature portion of the heat exchanger HE5 of the previous variants. The efficiency of the system of this embodiment is not affected at all.

This embodiment of the method of mixing a recirculating stream with a stream of basic solution can be applied to all variants described above. One experienced in the art can easily apply this method without further explanation.

An example of calculated parameters for the points described above are given in Table 1 for the embodiment shown in FIG. 1A.

TABLE 1

Parameter of Points in the Embodiment of FIG. 1A

| Point No. | Concentration X | Temperature T (° F.) | Pressure P (psia) | Enthalpy h (btu/lb) | Enthropy S (btu/lb° F.) | Weight (g/gl) |
|---|---|---|---|---|---|---|
| Parameters of Working Fluid Streams ||||||
| 1 | 0.975 | 73.5 | 133.4091 | 37.8369 | 0.09067 | 1.0 |
| 2 | 0.975 | 75.0186 | 520.0 | 40.1124 | 0.09145 | 1.0 |
| 3 | 0.975 | 165.0 | 508.2780 | 147.9816 | 0.27769 | 1.0 |
| 4 | 0.975 | 165.0 | 508.2780 | 147.9816 | 0.27769 | 0.6010 |
| 5 | 0.975 | 165.0 | 508.2780 | 147.9816 | 0.27769 | 0.3990 |
| 6 | 0.975 | 208.0 | 498.5 | 579.1307 | 0.96196 | 0.6010 |
| 7 | 0.975 | 208.0 | 498.5 | 579.1307 | 0.96196 | 0.3990 |
| 8 | 0.975 | 208.0 | 498.5 | 579.1307 | 0.96196 | 1.0 |
| 9 | 0.40874 | 170.2394 | 220.0 | 45.8581 | 0.21737 | 0.3880 |
| 10 | 0.81773 | 231.1316 | 498.5 | 433.8631 | 0.76290 | 1.40575 |
| 11 | 0.81773 | 300.0 | 490.0 | 640.0316 | 1.04815 | 1.40757 |
| 12 | 0.35855 | 300.0 | 490.0 | 200.2510 | 0.43550 | 0.1950 |
| 13 | 0.89168 | 300.0 | 490.0 | 710.8612 | 1.14682 | 1.21075 |
| 14 | 0.35855 | 300.0 | 490.0 | 200.2510 | 0.43550 | 0.1655 |
| 15 | 0.35855 | 300.0 | 490.0 | 200.2510 | 0.43550 | 0.17845 |
| 16 | 0.8845 | 300.0 | 490.0 | 703.9808 | 1.13724 | 1.2272 |
| 17 | 0.8845 | 306.0 | 488.5 | 718.3184 | 1.15637 | 1.2273 |
| 18 | 0.8845 | 213.3496 | 139.5 | 642.4511 | 1.17954 | 1.2273 |
| 19 | 0.35855 | 249.1433 | 220.0 | 200.2510 | 0.44140 | 0.17845 |
| 20 | 0.81671 | 214.6540 | 139.5 | 584.8515 | 1.08437 | 1.3880 |
| 21 | 0.81671 | 170.0 | 137.5 | 460.9041 | 0.89583 | 1.3880 |
| 22 | 0.97746 | 170.0 | 137.5 | 624.6175 | 1.16325 | 0.99567 |
| 23 | 0.40874 | 170.0 | 137.5 | 45.4163 | 0.21715 | 0.39233 |
| 24 | 0.40874 | 170.0 | 137.5 | 45.4163 | 0.21715 | 0.3880 |
| 25 | 0.40874 | 170.0 | 137.5 | 45.4163 | 0.21715 | 0.00433 |
| 26 | 0.975 | 170.0 | 137.5 | 622.1123 | 1.15916 | 1.0 |
| 27 | 0.975 | 93.9659 | 135.5 | 514.2431 | 0.97796 | 1.0 |
| 28 | 0.43013 | 195.9556 | 220.0 | 74.5165 | 0.26271 | 0.40575 |
| 29 | 0.43013 | 196.6491 | 498.5 | 75.8407 | 0.26312 | 0.40575 |
| 30 | 0.89772 | 249.1433 | 220.0 | 700.9614 | 1.21784 | 0.01775 |
| 31 | 0.2990 | 249.1433 | 220.0 | 144.9514 | 0.35565 | 0.16070 |
| 32 | 0.2990 | 233.8807 | 139.5 | 144.9514 | 0.35718 | .016070 |
| Parameters of Geothermal Source Stream ||||||
| 40 | brine | 315.0 | | 283.0 | | 3.90716 |
| 41 | brine | 311.3304 | | 279.3304 | | 3.90716 |
| 42 | brine | 237.4534 | | 2305.1534 | | 3.90716 |
| 43 | brine | 170.0 | | 138.0 | | 3.90716 |
| Parameters of Air Cooling Stream ||||||
| 50 | air | 51.7 | 14.7 | 122.3092 | | 91.647 |
| 51 | air | 51.9341 | 14.72 | 122.3653 | | 91.647 |
| 52 | air | 73.5463 | 14.7 | 127.5636 | | 91.647 |

In the system described above, the liquid produced in separator S1 eventually passes through heat exchanger HE5 and is partially vaporized. However, the composition of this liquid is only slightly richer than the composition of the liquid separated from the boiling solution in separator S2. In general, the richer the composition of the liquid added to the basic solution as compared to the composition of the liquid added to the spent working solution (point 18), the more efficient the system. In the proposed system, the bulk of liquid from separator S2, having parameter as point 15 is throttled to an intermediate pressure, and then divided into vapor and liquid in separator S3. As a result, the liquid stream having the parameters of the point 32 which is mixed with the spent working solution stream having the parameters of the point 18, is leaner than the liquid separated from the boiling solution in separator S2. In addition, the recirculating liquid which is separated in separator S1 is mixed with the vapor stream from separator S3, and, therefore, is enriched. As a result, the liquid stream having the parameters of the point 29, which is added to the stream of basic solution having the parameters of the point 10, is richer than the liquid stream produced from separator S1.

If the system is simplified, and the liquid stream from the separator S2 having parameters of the point 15 is throttled in one step to a pressure equal to the pressure of the stream having the parameters of the point 18, then the system requires less equipment, but its efficiency is slightly reduced. This simplified, but preferred variant of the system of this invention is shown in FIG. 1B, where the separator S3 and the throttle valve TV2 have been remove along with the streams having the parameters of the points 30, 31 and 32. The operation of such a variant of this system of FIG. 1A does not require further separate description because all of the remaining features are fully described in conjunction with the detailed description of system and process of FIG. 1A.

If the quantity of liquid from separator S1 is reduced to such a degree that the composition of the boiling solution stream having the parameters of the point 10 becomes equal to the composition of the working solution which passes through the turbine T1, then the separator S2 can be eliminated along with the throttle valve TV1. Therefore, the heat exchanger HE6 also becomes unnecessary, and is also eliminated because in this implementation there is no risk of liquid droplets being present in the boiling stream due to the absence of the separator S2. This even more simplified variant of the system of this invention is presented in FIG.

1C. Its efficiency is yet again lower that the efficiency of the previous variant described in FIG. 1B, but it is still more efficient than the system described in the prior art.

The choice in between the three variants of the system of this invention is dictated by economic conditions of operations. One experienced in the art can easily compare the cost of additional equipment, the value of additional power output given by increased efficiency and make an informed decision as to the exact variant chosen.

A summary of efficiency and performance of these three variants of this invention and the system described in the prior art are presented in Table 2.

TABLE 2

Performance Summary

| | Systems of This Invention | | | |
|---|---|---|---|---|
| | Variant 1 | Variant 2 | Variant 3 | Prior Art |
| Heat Input (Btu) | 566.5385 | 565.5725 | 564.2810 | 487.5263 |
| Specific Brine Flow (lb/lb) | 3.960716 | 3.9005 | 3.89159 | 3.36225 |
| Heat Rejection (Btu) | 476.4062 | 476.4062 | 476.4062 | 414.0260 |
| Turbine Enthalpy Drop (Btu) | 93.1119 | 91.7562 | 90.2988 | 75.376 |
| Turbine Work (Btu) | 90.7841 | 89.4623 | 88.0413 | 73.4828 |
| Pump Work (Btu) | 2.9842 | 2.5812 | 2.4240 | 1.867 |
| Air Fan Work (Btu) | 5.1414 | 5.1414 | 5.1414 | 3.5888 |
| Net Work (Btu) | 82.6785 | 81.7397 | 80.4759 | 68.027 |
| Net Thermal Efficiency (%) | 14.595 | 14.453 | 14.262 | 13.954 |
| Second Law efficiency (%) | 54.23 | 53.703 | 52.995 | 51.85 |

It is apparent from the simulated data in Table 2 that all three variants of this invention show improvements in net values: net work improvements of 21.54%, 20.16% and 18.30%, respectively; and net thermal and second law efficiency improvements of 4.59%, 3.58% and 2.21%, respectively.

Improved Variant

In yet another preferred embodiment of the system of this invention designed for the utilization of heat source with moderate to low initial temperature, such as geothermal, waste heat and similar sources, an improved configuration is described below.

In a previous variant a system was described which provided substantial improvements over the prior art U.S. Pat. No. 4,982,568 and this variant represents a further improvement in efficiency.

Figure 2:
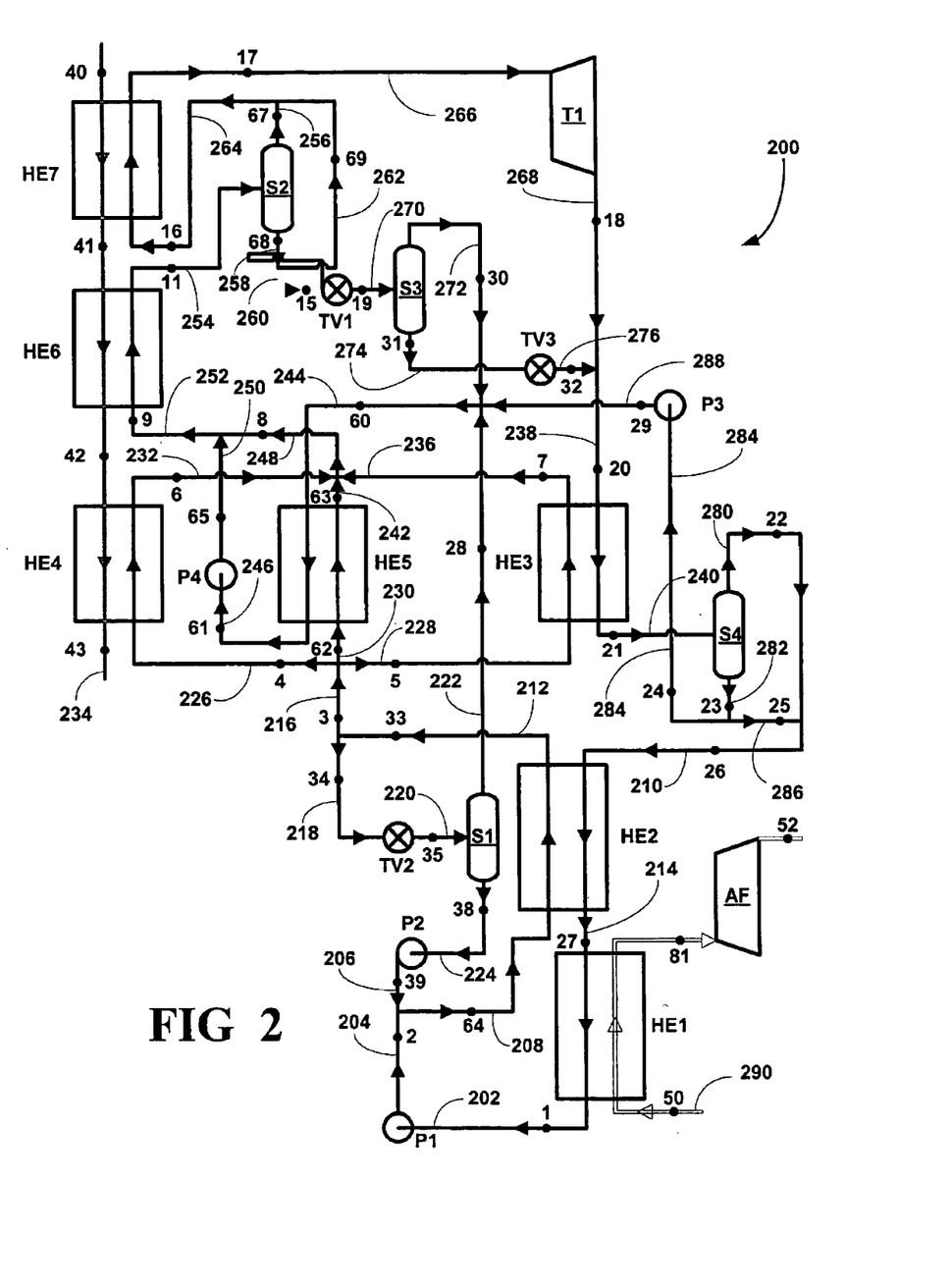
FIG. 2 depicts a schematic of another preferred thermodynamic cycle of this invention.

Referring now to FIG. 2, another preferred embodiment of the system of this invention, generally 200, is shown to include a fully condensed working fluid stream 202 at a temperature close to ambient having parameters as at a point 1, which corresponds to a state of saturated liquid, enters into a feed or first pump, P1. The stream 202 having parameters as at the point 1 is pumped to an elevated pressure obtaining a stream 204 having parameters as at a point 2. Thereafter, the stream 204 having the parameters as at the point 2 is mixed with a stream 206 of liquid having parameters as at a point 39, as described below, forming a stream 208 having parameters as at a point 64. The composition of the stream 206 having the parameters as at the point 39 is leaner than the composition of the stream 204 having the parameters as at the point 2 (i.e., the stream 206 has a lower concentration of the low-boiling component than does the stream 204.) Obviously, the composition of the stream 208 having the parameters as at the point 64 is leaner than the composition of the stream 204 having parameters as at the point 2, but richer (having a higher concentration of the low-boiling component) than the stream having the parameters as at the point 39.

Thereafter the stream 208 with the parameters as at the point 64 passes though a second heat exchanger HE2, where it is heated in counter-flow with a first stream 210 having parameters as at a point 26 in a first heat exchange process 26–27, as described below, to form a stream 212 having parameters as at a point 33, corresponding to a state of saturated or slightly sub-cooled liquid and a partially condensed stream 214 having parameters as at a point 27. Thereafter, the stream 212 having the parameters as at the point 33 is divided into two sub-streams 216 and 218, having parameters as at points 3 and 34, respectively. The stream 218 with the parameters as at the point 34 then passes through a second throttle valve, TV2, where its pressure is reduced, to form a lower pressure stream 220 having parameters as at a point 35. The stream 220 with the parameters as at the point 35, a mixed stream of vapor and liquid, and is sent into a first gravity separator, S1, where it is separated into a vapor stream 222 having parameters as at a point 28, and a liquid stream 224 having parameters as at a point 38. The liquid stream 224 having the parameters as at the point 38 enters into a second pump, P2, where it is pumped to a pressure equal to a pressure of the stream 204 having the parameters as at the point 2, forming the stream 206 having the parameters as at the point 39. Thereafter, the stream 206 with parameters as at the point 39 is mixed with the stream 204 having the parameters as at the point 2, as described above.

The stream 216 having a composition represented by the parameters as at the point 3 will have a composition referred to herein as a first boiling composition. Obviously, the compositions of the streams 208, 212, 218, and 220 having the parameters of the points 64, 33, 34 and 35, respectively, are the same composition as the stream 216 having the parameters as at the point 3. The composition of the streams 202 and 204 having the parameters as at the points 1 and 2, respectively, will have the composition referred to as a basic composition. The composition of the streams 210 and 214 having the parameters as at the points 26 and 27, respectively as described below, is the same the composition of the streams 202 and 204 having the parameters as at the points 1 and 2.

The stream 216 having the first boiling composition and the parameters as at the point 3, is divided into three sub-streams 226, 228, and 230 having parameters as at points 4, 5 and 62, respectively. The sub-stream 226 having the parameters as at the point 4 passes through a fourth heat exchanger HE4, where it is heated, boiled and partially vaporized to form a first partially vaporized stream 232 having parameters as at a point 6 in counter-flow with a stream 234 of a heat source fluid having entering parameters as at a point 43 and leaving parameters as at a point 45, where the stream 234 is a geothermal fluid in the case of a geothermal installation. The sub-stream 228 having the parameters as at the point 5 passes through a third heat exchanger HE3, where it is heated, boils and is partially vaporized to form a second partially vaporized stream 236 having parameters as at a point 7, in counter-flow with a returning condensing stream 238 having parameters as at a point 20 to form a partially condensed stream 240 having parameters as at a point 21, as described below. The sub-stream 230 having the parameters as at the point 62 passes through a fifth heat exchanger HE5 where it is heated, boiled and partially vaporized to form a third partially vaporized stream 242 having parameters as at a point 63 in counter-flow by a condensing stream 244 having parameters as at a point 60 to form a fully condensed stream 246 having parameters as at a point 61, as described below.

Thereafter, the streams 232, 236, and 242 having the parameters as at the points 6, 7, and 63, respectively, are combined forming a combined stream 248 having parameters as at a point 8. The fully condensed stream 246 having the parameters as at the point 61 enters into a circulating or a fourth pump P4, where it is pumped to a pressure equal to a pressure of the stream 248 as at the point 8, as described above, to form a higher pressure fully condensed stream 250 having parameters as at a point 65. Thereafter, the stream 250 having the parameters as at the point 65 is combined with the stream 248 having the parameters as at the point 8, forming a second combined stream 252 having parameters as at a point 9. It is obvious that the composition of the streams 226, 228, 252, 236, 230, 242 and 248 having the parameters as at the points 4, 5, 6, 7, 62, 63 and 8, respectively, are the same as the composition of the stream 216 having the parameters as at the point 3, i.e., the first boiling composition. Because the composition of the streams 244, 246 and 250 having parameters as at the points 60, 61 and 65 is leaner than the first boiling composition, the composition of the combined stream 252 having the parameters as at the point 9 is leaner than the first boiling composition. The composition of the streams 244, 246 and 250 having parameters as at the points 60, 61 and 65 is referred to herein as a recirculating composition, while the composition of the combined stream 252 having the parameters as at the point 9 is referred to herein as a second boiling composition.

The second combined stream 252 having the second boiling composition and the other parameters as at the point 9 passes through a sixth heat exchanger HE6, where it is further boiled and vaporized to form a further vaporized stream 254 having parameters as at a point 11, in counter-flow by the stream 234 of the heat source fluid having entering parameters as at a point 41 and leaving parameters as at a point 43. Thereafter, the further vaporized stream 254 having the second boiling composition and the other parameters as at the point 11 enters into a second gravity separator S2, where it is separated into a second vapor stream 256 having parameters as at a point 67, and a second liquid stream 258 having parameters as at a point 68. The second liquid stream 258 having the as at the point 68 may be separated into two sub-streams 260 and 262 having parameters as at points 15 and 69, respectively, in some preferred embodiment of this variant a flow rate of the stream 262 having the parameter as at the point 69 will be is equal to zero. The stream 262 having the parameters as at the point 69, if present, is combined with the second vapor stream 256 having the parameters as at the point 67, forming a third combined stream 264 having parameters as at a point 16, the composition of which will hereafter be referred to as a working composition.

The stream 264 having the working composition and the other parameters as at the point 16 passes through a seventh heat exchanger HE7, where it is heated and fully vaporized, and slightly superheated to form a fully vaporized stream 266 having parameters as at a point 17, in counter-flow by the stream 234 of the heat source fluid having entering parameters as at a point 40 and leaving parameters as at a point 41. The fully vaporized stream 266 having the working composition and the other parameters as at the point 17, then passes through a turbine T1, where it expands, producing work, and forming a spent stream 268 having the working composition and other parameters as at a point 18.

The second liquid stream 260 having the parameters as at the point 15, as described above, passes through a first throttle valve TV1, where its pressure is reduced to a pressure equal to the pressure of the stream 222 having the parameters as at a point 28, as described above, to form a lower pressure stream 270 having parameters as at a point 19. Then, the stream 270 having the parameters as at the point 19 enters a third gravity separator S3, where it is separated into a third vapor stream 272 having parameters as at a point 30 and a third liquid stream 274 having parameters as at a point 31. Thereafter, the third liquid stream 274 having the parameters as a the point 31 passes through a third throttle valve TV3, where its pressure is reduced to a pressure equal to a pressure of the spent stream 268 having the parameters as at the point 18, as described above, to form a lower pressure stream 276 having parameters as at a point 32. The stream 276 having the parameters as at the point 32 is then combined with the spent stream 268 having parameters as at the point 18, forming the [third combined] stream 238 having parameters as at the point 20.

The stream 238 having parameters as at the point 20 passes through the third heat exchanger HE3, where it partially condenses, providing heat for a heat exchange process 5–7, as described above, forming the stream 240 having the parameters at as the point 21. The stream 240 having the parameters as at the point 21 enters into a fourth gravity separator S4, where it is separated into a fourth vapor stream 280 having parameters as at a point 22, and a fourth liquid stream 282 having parameters as at a point 23. Then, the fourth liquid stream 282 having parameters as at a point 23 is divided into two liquid sub-streams 284 and 286, having parameters as at points 24 and 25, respectively. The liquid sub-stream 286 having the parameters as at the point 25 is combined with the fourth vapor stream 280 having parameters as at the point 22, forming the stream 210 having the basic composition and the other parameters as at the point 26.

The liquid sub-stream 284 having the parameters as at the point 24 enters into a circulating or third pump P3, where it is pumped to a pressure equal to a pressure of the streams 222 and 272 having the parameters as at points the 28 and 30, as described above, forming a higher pressure stream 288 having parameters as at a point 29. Thereafter, the streams 222, 272, and 288 having the parameters as at points the 28, 29, and 30 are combined together forming the stream 244 having the circulating composition and the other parameters as at the point 60. The stream 244 having the parameters as at the point 60, passes through the third heat exchanger HE3, where it is fully condensed, providing heat for a process 62–63, to form the stream 246 having the parameters as at the point 61, as previously described. Again, the liquid stream 246 having the parameters as at the point 61 is pumped by the circulating or fourth pump P4, to form the higher pressure stream 250 having the parameters as at the point 65, which is then mixed with the stream 248 having the first boiling composition and the other parameters as at the point 8, forming the combined stream 252 having the second boiling composition and the other parameters as at the point 9, as described above.

The stream 210 having the basic composition and other parameters as at the point 26 passes through the second heat exchanger HE2, where it partially condenses, providing heat for a heat-exchange process 64–33, as described above, forming the partially condensed stream 214 having parameters as at a the point 27. Then, the stream 214 having parameters as at the point 27 passes through a first condenser-heat exchanger HE1, where it is cooled by a coolant stream 290 having initial parameter as at a point 50 and final parameters as at a point 51 (water or air), to form the fully condensed stream 202 having parameters as at the point 1.

As in the other variants of the system of this invention, the embodiments described above are also is closed.

As with the previous embodiment of system of this invention that the latest variant improves upon, the working process of the system of this invention is composed of two cycles. The first cycle is a cycle of the first boiling composition, which is heated and vaporized and then expands in the turbine, and then fully condenses in the first heat exchanger HE1, a condenser. The second cycle is a cycle of the recirculating composition, which only partially boils, producing vapor, this vapor also passes through the turbine, and mostly or completely condenses in the third heat exchanger HE3 (a recuperative boiler/condenser). The richer the composition of the liquid stream 284 having the parameters as at the point 24 (i. e., the liquid produced in the recuperative boiler/condenser HE3), the larger the portion of this stream that can be subsequently vaporized, thus increasing the efficiency of the overall process.

In the previous variants, the liquid stream having the initial parameters as at the point 24 was pumped to an intermediate pressure, enriched by mixing with a vapor stream having the parameters as at the point 30, and then added to a stream of the first boiling composition. In the present variant of the system of this invention, the condensed liquid having the parameters as at the point 24 is pumped and then enriched, not only by the stream of vapor having the parameters as at the point 30, but also with a much larger stream of vapor having parameters as at the point 28. As a result, the streams 244, 246 and 250 having the recirculating composition and the other parameters as at the points 60, 61 and 65, respectively, are enriched significantly more than in the previous designs or variants. The additional enriching with the vapor stream 222 having the parameters as at the point 28 is produced by better utilization of heat released in the process of condensation of the basic composition.

As a result of this better utilization of heat release in the condensation process, the latter variant of the system of this invention has an overall efficiency of 3% to 5% higher than the previous variants of the system of this invention. A sample of the heat and performance balances of this latter variant of the system of this invention are tabulated in Tables 3–5, and the parameters of all points described above and designated in FIG. 2 are tabulated in Table 6.

TABLE 3

Simulated Heat Balance Data

| Property | Energy kW | Energy Btu/lb |
|---|---|---|
| Heat In | 84,926.44 | 546.57 Btu/lb |
| Heat Rejected | 70,606.87 | 454.42 Btu/lb |
| Turbine enthalpy drops | 14,912.74 | 95.98 |
| Gross Generator Power | 14,220.04 | 91.52 |
| Process Pumps (−3.82) | −653.04 | −4.20 |
| Cycle Output | 13,567.00 | 87.32 |
| Other Pumps and Fans (−4.87) | −813.26 | −5.23 |
| Net Output | 12,753.74 | 82.08 |
| Gross Generator Power | 14,220.04 | 91.52 |
| Cycle Output | 13,567.00 | 87.32 |
| Net Output | 12,573.74 | 82.08 |

TABLE 4

Simulated Efficiency Data

| Property | Percentage % |
|---|---|
| Net thermal efficiency | 15.02 |
| Second Law Limit | 26.91 |
| Second Law Efficiency | 55.80 |

TABLE 5

Simulated Specific Consumption Data

| Property | Heat Btu/lb |
|---|---|
| Specific Brine Consumption | 154.55 |
| Specific Power Output | 6.47 |

Overall Heat Balance (Btu/lb)

Heat In is equal to Brine plus pumps=546.57+3.82=550.39

Heat Out is equal to turbine plus condenser=95.98+454.42=550.39

TABLE 6

Simulated Specific Consumption Data

| Pt. | X lb/lb | T ° F. | P psia | H Btu/lb | S Btu/lb-R | G Rel. G/G ∞ 1 | Phase | Wetness lb/lb |
|---|---|---|---|---|---|---|---|---|
| | | | | WORKING FLUID | | | | |
| 1 | 0.9299 | 73.27 | 126.766 | 22.3023 | 0.08415 | 1.06803 | Mix | 1 |
| 2 | 0.9298 | 74.67 | 498.675 | 24.4996 | 0.09502 | 1.06903 | Liq | −93.23° F.[a] |
| 3 | 0.9250 | 165.00 | 478.675 | 130.1713 | 0.26958 | 1.00000 | Mix | 1 |
| 4 | 0.9250 | 165.00 | 478.675 | 130.1713 | 0.26958 | 0.45691 | Mix | 1 |
| 5 | 0.9250 | 165.00 | 478.675 | 130.1713 | 0.26958 | 0.41981 | Mix | 1 |
| 6 | 0.9250 | 213.11 | 477.675 | 527.0695 | 0.89377 | 0.45691 | Mix | 0.1624 |
| 7 | 0.9250 | 207.99 | 477.675 | 515.2115 | 0.81618 | 0.41981 | Mix | 0.1769 |
| 8 | 0.9250 | 209.22 | 477.675 | 515.8261 | 0.97100 | 1.00000 | Mix | 0.1761 |
| 9 | 0.8254 | 213.11 | 477.675 | 396.6378 | 0.71018 | 1.34291 | Mix | 0.4228 |
| 11 | 0.8254 | 303.50 | 476.675 | 666.9563 | 1.08645 | 1.34287 | Mix | 0.1022 |
| 15 | 0.3433 | 303.50 | 476.675 | 205.2395 | 0.00000 | 0.13718 | Mix | 0 |

TABLE 6-continued

Simulated Specific Consumption Data

| Pt. | X lb/lb | T °F. | P psia | H Btu/lb | S Btu/lb-R | G Rel. G/G ∞ 1 | Phase | Wetness lb/lb |
|---|---|---|---|---|---|---|---|---|
| 16 | 0.8803 | 303.50 | 476.675 | 719.3763 | 1.15990 | 1.20569 | Vap | 0° F.[a] |
| 17 | 0.9903 | 306.00 | 475.175 | 721.3333 | 1.16278 | 1.20569 | Vap | 2.7° F.[a] |
| 18 | 0.8803 | 211.57 | 131.766 | 641.7309 | 1.19377 | 1.20569 | Mix | 0.0624 |
| 19 | 0.3433 | 259.31 | 235.449 | 205.2395 | 0.44562 | 0.13718 | Mix | 0.912 |
| 20 | 0.8249 | 212.99 | 131.766 | 596.1109 | 1.10762 | 1.330BO | Mix | 0.1457 |
| 21 | 0.8249 | 170.00 | 130.766 | 474.6254 | 0.92207 | 1.33090 | Mix | 0.2613 |
| 22 | 0.9757 | 170.00 | 130.766 | 626.2892 | 1.17133 | 0.99303 | Mix | 0 |
| 23 | 0.3986 | 170.00 | 130.766 | 45.9319 | 0.21750 | 0.34778 | Mix | 1 |
| 24 | 0.3986 | 170.00 | 130.766 | 45.9319 | 0.21150 | 0.26277 | Mix | 1 |
| 25 | 0.3986 | 170.00 | 130.766 | 45.9319 | 0.21750 | 0.09501 | Mix | 1 |
| 26 | 0.9298 | 170.00 | 130.766 | 580.0959 | 1.09541 | 1.06803 | Mix | 0.0796 |
| 27 | 0.9298 | 99.23 | 128.766 | 441.1110 | 0.91316 | 1.06903 | Mix | 0.2106 |
| 28 | 0.9997 | 113.13 | 235.449 | 560.4625 | 0.99869 | 0.06803 | Mix | 0 |
| 29 | 0.3986 | 170.34 | 235.449 | 46.5386 | 0.21185 | 0.26277 | Liq | −44.74° F.[a] |
| 30 | 0.8851 | 259.31 | 235.449 | 110.8870 | 1.22271 | 0.01207 | Mix | 0 |
| 31 | 0.2910 | 259.31 | 235.449 | 156.4614 | 0.37066 | 0.12511 | Mix | 1 |
| 32 | 0.2910 | 225.92 | 131.766 | 156.4614 | 0.37300 | 0_12511 | Mix | 0.9453 |
| 33 | 0.9250 | 165.00 | 478.675 | 130.1713 | 0.26958 | 1.50538 | Mix | 1 |
| 34 | 0.9250 | 165.00 | 478.675 | 130.1713 | 0.26958 | 0.50538 | Mix | 1 |
| 35 | 0.9250 | 113.13 | 235.449 | 130.1713 | 0.27648 | 0.50539 | Mix | 0.8654 |
| 38 | 0.9134 | 113.13 | 235.449 | 63.2351 | 0.16414 | 0.43735 | Mix | 1 |
| 39 | 0.9134 | 114.48 | 498.675 | 65.0826 | 0.16514 | 0.43735 | Liq | −55.04° F.[a] |
| 60 | 0.5350 | 199.51 | 235.449 | 171.8993 | 0.41197 | 0.34287 | Mix | 0.8295 |
| 61 | 0.5350 | 170.00 | 234.449 | 47.5498 | 0.21963 | 0.34287 | Mix | 1 |
| 62 | 0.9250 | 165.00 | 478.675 | 130.1713 | 0.26959 | 0.12328 | Mix | 1 |
| 63 | 0.9250 | 193.51 | 477.675 | 476.0256 | 0.81670 | 0.12328 | Mix | 0.2323 |
| 64 | 0.9250 | 96.39 | 498.675 | 36.2899 | 0.10896 | 1.50539 | Liq | −81.99° F.[a] |
| 65 | 0.5350 | 170.97 | 477.675 | 49.0179 | 0.21944 | 0.34287 | Liq | −61.41° F.[a] |
| 67 | 0.9603 | 303.50 | 476.675 | 719.3763 | 1.15990 | 1.20569 | Mix | 0 |
| 68 | 0.3433 | 303.50 | 476.675 | 205.2395 | 0.44092 | 0.13718 | Mix | 1 |
| 69 | 0.3433 | 303.50 | 476.675 | 205.2395 | 0.00000 | 0.00000 | Mix | 0 |
| HEAT SOURCE | | | | | | | | |
| 40 | BRINE | 315.00 | 0.000 | 287.1318 | 0.00000 | 3.71523 | Liq | |
| 41 | BRINE | 314.37 | 0.000 | 286.4967 | 0.00000 | 3.71523 | Liq | |
| 43 | BRINE | 219.11 | 0.000 | 198.8263 | 0.00000 | 3.71523 | Liq | |
| 45 | BRINE | 170.00 | 0.000 | 140.0149 | 0.00000 | 3.71523 | Liq | |
| COOLANT | | | | | | | | |
| 50 | AIR. | 51.70 | 14.693 | 122.3092 | 1.62806 | 67.5974 | Vap | 511.4° F.[a] |
| 51 | AIR | 79.65 | 14.673 | 129.0316 | 1.64095 | 67.5974 | Vap | 539.3° F.[a] |
| 52 | AIR | 79.95 | 14.693 | 129.1036 | 1.64099 | 67.5974 | Vap | 539.6° F.[a] |

[a]Temperature of Stream at the indicated point

All references cited herein are incorporated by reference. While this invention has been described fully and completely, it should be understood that, within the scope of the appended claims, the invention may be practiced otherwise than as specifically described. Although the invention has been disclosed with reference to its preferred embodiments, from reading this description those of skill in the art may appreciate changes and modification that may be made which do not depart from the scope and spirit of the invention as described above and claimed hereafter.

I claim:

1. A method for implementing a thermodynamic cycle comprising the steps of:

transforming thermal energy from a fully vaporized boiling stream into a usable energy form to produce a lower pressure, spent stream;

transferring thermal energy from an external heat source stream to a boiling stream to form the fully vaporized boiling stream and a cooled external heat source stream;

transferring thermal energy from the spent stream to a first portion of a heated higher pressure, basic working fluid stream to form a partially condensed spent stream and a first pre-heated, higher pressure, basic working fluid stream;

transferring thermal energy from the cooled external heat source stream to a second portion of the heated higher pressure, basic working fluid stream to form a second pre-heated, higher pressure, basic working fluid stream and a spent external heat source stream;

combining the first and second pre-heated, higher pressure basic working fluid streams to form a combined pre-heated, higher pressure basic working fluid stream;

separating the partially condensed spent stream into a separated vapor stream and a separated liquid stream;

pressurizing a first portion of the separated liquid stream to a pressure equal to a pressure of the combined pre-heated, higher pressure basic working fluid stream to form a pressurized liquid stream;

combining the pressurized liquid stream with the combined pre-heated, higher pressure basic working fluid stream to form the boiling stream;

combining a second portion of the separated liquid stream with the separated vapor stream to from a lower pressure, basic working fluid stream;

transferring thermal energy from the lower pressure, basic working fluid stream to a higher pressure, basic working fluid stream to form the heated, higher pressure, basic working fluid stream and a cooled, lower pressure, basic working fluid stream;

transferring thermal energy cooled, lower pressure, basic working fluid stream to an external coolant stream to from a spent coolant stream and a fully condensed, lower pressure, basic working fluid stream; and pressurizing the fully condensed, lower pressure, basic working fluid stream to the higher pressure, basic working fluid stream.

2. The method of claim 1, wherein the external heat source stream is a geothermal stream.

3. A method for implementing a thermodynamic cycle comprising the steps of:

transforming thermal energy from a fully vaporized basic working fluid stream into a usable energy form to produce a lower pressure, spent stream;

combining the spent stream with a depressurized liquid stream to form a lower pressure mixed stream, transferring thermal energy from the lower pressure mixed stream to a first portion of a pre heated higher pressure, basic working fluid stream to form a cooled mixed lower pressure stream and a first heated, higher pressure, basic working fluid stream;

separating the cooled mixed lower pressure stream into a separated lower pressure vapor stream and a separated lower pressure liquid stream;

mixing a first portion of the separated liquid stream with the separated vapor stream to form a second mixed lower pressure stream, transferring thermal energy from the second mixed lower pressure stream to a higher pressure, basic working fluid stream to form a pre-heated higher pressure, basic working fluid stream and a cooled second mixed lower pressure stream, condensing the cooled second mixed lower pressure stream with an external cooling stream to form a fully condensed lower pressure basic working fluid stream, pressuring the fully condensed lower pressure basic working fluid stream to form a higher pressure basic working fluid stream, transferring thermal energy from a thrice cooled external heat source stream to a second portion of the pre-heated higher pressure basic working fluid stream to form a second heated higher pressure basic working fluid stream and a spent external heat source stream, combining the first and second heated higher pressure, basic working fluid streams to form a combined heated, higher pressure, basic working fluid stream;

transferring thermal energy from a twice cooled external heat source stream to the combined heated, higher pressure basic working fluid streams to form a hotter higher pressure basic working fluid stream and the thrice cooled external heat source stream;

combining a higher pressure separated vapor stream with the hotter higher pressure basic working fluid stream to form a mixed higher pressure stream;

transferring thermal energy from a once cooled external heat source stream to the mixed higher pressure stream to form the twice cooled external stream and a partially vaporized higher pressure stream, separating the partially vaporized higher pressure stream into a second separated vapor higher pressure stream and a second separated higher pressure liquid stream;

transferring thermal energy from an external heat source stream to the second separated vapor higher pressure stream to form the once cooled external heat source stream and the fully vaporized basic working fluid, reducing the pressure of the second separated higher pressure liquid stream to form a reduced pressure mixed stream;

separating the reduced pressure mixed stream into the first separated vapor stream and a first reduced pressure separated liquid stream, and reducing the pressure of the reduced pressure separated liquid stream into the lower pressure liquid stream.

4. The method of claim 3, wherein the external heat source stream is a geothermal stream.

5. A method for implementing a two cycle thermodynamic system comprising the steps of:

combining a first compositional stream with a second compositional stream having a recirculating composition to form a combined stream;

heating the combined stream to form a mixed combine stream with an external heat source stream;

separating the mixed combined stream into a vapor combined stream and a liquid stream;

fully vaporizing the vapor combined stream to form a fully vaporized stream with the external heat source stream;

expanding and transforming thermal energy from the fully vaporized stream into a usable energy form to produce a spent stream, cooling and separating the spent stream into a first compositional precursor stream and a second compositional precursor stream;

condensing the first compositional precursor stream;

forming the first compositional stream from the first compositional precursor stream and an enriched stream having a lower concentration of a low-boiling component; and forming the second compositional stream from the second compositional precursor stream and two lean vapor stream having a higher concentration of the low-boiling component.

6. The method of claim 5, wherein the external heat source stream is a geothermal stream.

7. The method of claim 5, wherein the streams comprise multi-component fluids including the low-boiling component and a high-boiling component.

8. The method of claim 5, wherein the streams comprise an ammonia-water mixture, a mixture of two or more hydrocarbons, a mixture of two or more freons, or a mixture of hydrocarbons and freons, where the mixtures includes the low-boiling component and a high-boiling component.

9. The method of claim 5, wherein the low-boiling component is ammonia and a high-boiling component is water.

* * * * *